(No Model.)
W. STANLEY, Jr. & J. F. KELLY.
ALTERNATING CURRENT MOTOR.
No. 483,816.          Patented Oct. 4, 1892.
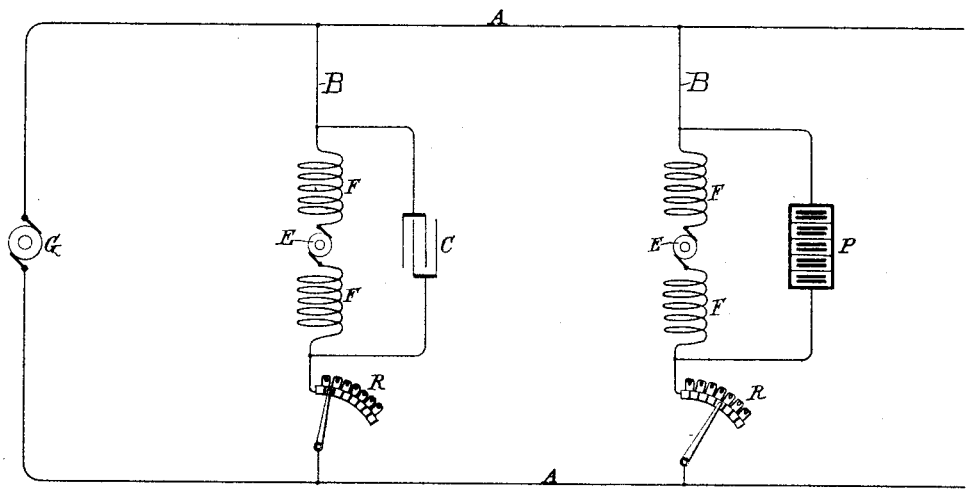
Witnesses:
Raphael Netter
James Catlow
Inventors
William Stanley, Jr.
and John F. Kelly.
by Duncan & Page
Attorneys

UNITED STATES PATENT OFFICE.

WILLIAM STANLEY, JR., AND JOHN F. KELLY, OF PITTSFIELD, MASSACHUSETTS.

ALTERNATING-CURRENT MOTOR.

SPECIFICATION forming part of Letters Patent No. 483,816, dated October 4, 1892.

Application filed March 10, 1892. Serial No. 424,591. (No model.)

*To all whom it may concern:*

Be it known that we, WILLIAM STANLEY, Jr., and JOHN F. KELLY, both citizens of the United States, and residents of Pittsfield, in the county of Berkshire and State of Massachusetts, have invented certain new and useful Improvements in Alternating-Current Motors, of which the following is a specification, reference being had to the drawings accompanying and forming a part of the same.

This invention is an improvement applicable to systems of electrical-power transmission by means of electro-magnetic motors and a source or generator of alternating currents. When an alternating current is caused to flow through a circuit possessing self-induction, the variations in the current lag behind those of the impressed electro-motive force through an angle which for a given periodicity of current is dependent upon the ratio of the coefficient of self-induction to the resistance and forces acting in the direction of the resistance. It is found, and this depends upon well-understood laws, that any considerable amount of self-induction in a circuit will interpose a formidable obstacle to the economical transmission of energy through it requiring an increased capacity of the generating plant and lowering the efficiency. If, for example, it is proposed to use series-wound motors in an alternating-current circuit, it will in general be found that all the advantages gained by the higher tension at which the alternating current may be used will be more than counteracted by the results of the lag of the current and that a low-potential continuous-current system of distribution will be more economical and effective than the high-potential alternating system.

We have devised various plans for overcoming the detrimental effects of self-induction, so as to render available alternating-current systems of power transmission with all their attendant advantages. One of the plans which we have employed for this purpose was to insert in series with the motor or other device which produced the self-induction an electrical condenser of a value that would neutralize the self-induction of such motor. We have also found that the same general result may be secured, but much more conveniently and economically, by substituting for the condenser a device known as a "polarization-cell," which, in general terms, consists of one or more couples of conducting-plates immersed in an electrolyte, by which they are not chemically attacked, but which have the capability of developing an electro-motive force due to polarization when a current is passed between the plates through the electrolyte. Our present invention accomplishes the same purpose in another way—that is to say, by the employment of a condenser or polarization-cell with each motor, but in a shunt thereto and not in series. The operation of such a disposition we explain in the following manner: The lagging or retarded current may be regarded as made up of two components, one coinciding in phase with the impressed electro-motive force and the other at right angles thereto. The current which flows thorugh a condenser or polarization-cell has a negative lag with respect to the impressed electro-motive force—that is to say, the electro-motive force of the condenser or the polarization-cell is ahead of the current, while the opposite is true of the electro-motive force of self-induction which is behind the current. If the resistance in series with the condenser or polarization-cell be very low, the change of phase will be approximately ninety degrees. If, therefore, we place in shunt around the motor a condenser or a polarization-cell of very low resistance and of such capacity that the current driven through it by the impressed electro-motive force shall be equal in magnitude to the lagging component of the motor-current, the two being one hundred and eighty degrees apart, will completely neutralize each other with reference to the line and the generator, and the output demanded from one and the loss in the other will be reduced proportionally to the work to be performed, as in a continuous-current motor.

We have appended a diagram of a system to which our invention is applied.

G designates a generator of alternating currents, and A A are conductors of the main line. B B are parallel branches between these conductors. In each of such branches is a motor, of which E represents the armature, and F the field-circuit. In shunts S to each motor is a condenser C or a polarizable voltameter or polarization-cell P of a value adjusted to neutralize the self-induction of the motor. A variable resistance R is placed in each branch circuit for adjusting the current on the start.

We do not claim the principle of neutralizing the electro-motive force of self-induction either by condensers or by that due to polarization, our invention residing first in the particular manner of utilizing and applying a condenser with a motor herein described, or what we have discovered to be in effect the equivalent of a condenser under such circumstances, a polarization-cell.

What we claim is—

The combination, with an alternating-current motor, of a condenser or its described equivalent in a shunt to the motor and of a capacity or value capable of neutralizing the self-induction of the motor with which it is associated, as set forth.

WILLIAM STANLEY, JR.
JOHN F. KELLY.

Witnesses:
W. B. TOBEY,
W. A. WHITTLESEY.